Jan. 16, 1951     L. K. CECIL ET AL     2,538,412
SLUDGE HEATER Filed Dec. 29, 1945     4 Sheets-Sheet 1

Fig.1

INVENTORS:-
Herbert W. Gillard
Lawrence K. Cecil
BY
Robyn Silcox
Att'y.

Jan. 16, 1951 L. K. CECIL ET AL 2,538,412
SLUDGE HEATER

Filed Dec. 29, 1945 4 Sheets-Sheet 3

INVENTOR.
Herbert W. Gillard
Lawrence K. Cecil
BY Robyn Wilcox
Att'y.

INVENTOR.
*Herbert W. Gillard*
*Lawrence K. Cecil*
BY
*Att'y.*

Patented Jan. 16, 1951

2,538,412

UNITED STATES PATENT OFFICE 2,538,412

SLUDGE HEATER

Lawrence K. Cecil, Tulsa, Okla., and Herbert W. Gillard, Oak Park, Ill., assignors to Infilco Incorporated, Chicago, Ill., a corporation of Delaware Application December 29, 1945, Serial No. 638,240

13 Claims. (Cl. 210—2)

This invention relates to a new and improved method of, and an apparatus for, the heating of sewage sludge, and specifically it relates to the heating of such sludge by means of a combustion apparatus submerged in such sludge.

One object of this invention is to provide an improved method and apparatus for heating sludge.

Another object is to provide improved apparatus that will eliminate heating coils and their supports in a sludge digester, which coils and supports are subject to corrosion and deposits of sludge thereon which cakes and interferes with the heating of the sludge, with their consequent maintenance difficulties, and to substitute therefor a relatively small and efficient heating unit which can readily be removed from the digester without emptying the digester.

A further object of this invention is to provide a more efficient means for heating sewage sludge to facilitate its digestion, by direct transfer of heat of combustion into the digester liquid.

Another object of this invention is to utilize products of combustion to maintain desired circulation of digester tank contents.

Another object of this invention is to provide a heating element which can be readily and easily removed from the digester for inspection, repair or renewal, and easily replaced.

Specifically, one of the objects of this invention is to provide a construction and method of operation wherein heat is delivered to the sludge directly from the source of such heat and wherein the products of combustion aid in causing circulation of the sludge.

Particularly, it is an object of our invention to maintain the sludge, such as that undergoing digestion, at a constant predetermined temperature by providing in the body of the sludge a submerged burner, preferably utilizing digestion gases, heating and circulating the sludge by the rising combustion gases; and to separate the combustion gases from any gas formed in the digestion of the sludge, whereby such digestion gases are not diluted with inert gases such as carbon dioxide or nitrogen.

Other objects of the invention will become apparent from the consideration of the various features of construction shown and described herein and in the claims which follow.

Usually sewage sludge is heated in order to expedite its digestion, and for this reason our invention will be described in connection with a sludge digester. However, there are other reasons for heating sludge, such as to cook, or sterilize, it to expedite its dewatering without digestion, and the like. Thus, while we will describe our process in connection with sludge digestion, it will be understood that we are not limited thereby.

It is known that in the anaerobic digestion of sewage sludge the maintenance of elevated temperatures, either in the mesophilic or thermophilic range, greatly expedites the digestion of the sludge. This is important in the efficient operation of sewage treatment plants because under normal conditions it requires about three months for the digestion of sludge and in cold weather the period may be six months or even longer. However, if the sludge is maintained at a temperature of about 80° F. (70° F. to 85° F.) commonly called "mesophilic digestion," or is given a two stage treatment in which it is maintained at mesophilic temperatures in one stage and at a thermophilic range (between 120° F. and 135° F.) in another stage, the sewage sludge will be completely digested in a relatively short time—often in two or three weeks.

Obviously, there is a considerable saving in investment for sludge digesters and the ground required for them if sludge heating is practiced.

In the past the heating of the sludge has usually been secured by heating coils placed in the digester, the coils being mounted on suitable brackets around the walls of the tank, and heated with warm or hot water. These coils are submerged in the digesting sludge and are subject to considerable corrosion. They are also subject to considerable caking of sludge, which obviously interferes with the transmission of heat through the walls of the coil. The only manner in which the cake could be removed or the coils repaired was to empty the digester and then have workmen go inside the digester and clean or repair the coils—obviously a very objectionable, dangerous and expensive procedure. Other methods of heating sludge have been suggested, but as far as applicants are aware, all have had the common disadvantages of losing much of the heat value of the fuel due to inefficient methods of heat transfer, and of considerable expense and difficulty in effecting maintenance and repair. Thus, in spite of the great advantages which can be secured from sludge heating, these maintenance and expense difficulties have interfered with a wider adoption of the practice in sewage plants.

Our invention is aimed at removing these difficulties and providing a heating apparatus which can readily be lifted through a small opening in the top of the tank when repairs are necessary, thus avoiding emptying the digester or interfering with the normal processes of digestion.

As illustrated in the drawings, our invention comprises a burner element which is directly submerged in the sewage sludge undergoing digestion, whereby heat obtained from the gases of combustion may be more directly transferred to the digesting sludge and preferably in a manner that will also provide circulation of the sludge. It will be noted that this arrangement may be used with either a fixed cover digester or a digester equipped with a floating cover or a rotating cover. The invention may also be used by locating the submerged burner in a vessel surrounded by the digester liquid in a digester tank so as to effect heat transfer from a fluid within the heating vessel through the walls of the vessel to the digester sludge. It will be noted in this connection that the vessel may be stationary or may be made to rotate with suitable paddle arrangements that will set up circulation within the digester tank over and above the circulation that may be set up by convection currents. It will further be noted that the heat exchange device preferably will be located within the digestion tank, whereby the heat may be most efficiently transferred to the sludge undergoing digestion.

It is well known that in the process of digestion of sludge a large amount of combustible gas is formed, principally methane. While this is collected in a gas dome at the top of the digester, it is formed throughout the digesting sludge and it might be presumed that submerged combustion in the digester might cause an explosion of the digester gas. We have found, however, that submerged combustion is practical and that although a mixture of digester gas and air is highly explosive, there is no danger in burning digester gas within the body of sludge. It might also be presumed that the combustion gases, principally inert nitrogen and inert carbon dioxide, would collect with the digester gas and therefore progressively dilute it with the inert gases. However, the structure which we propose avoids this difficulty as the combustion gases are kept separate from the gases formed by the digestion process, so that such dilution is not possible.

Our invention will be readily understood from the figures which form a part hereof and in which.

Figure 1:
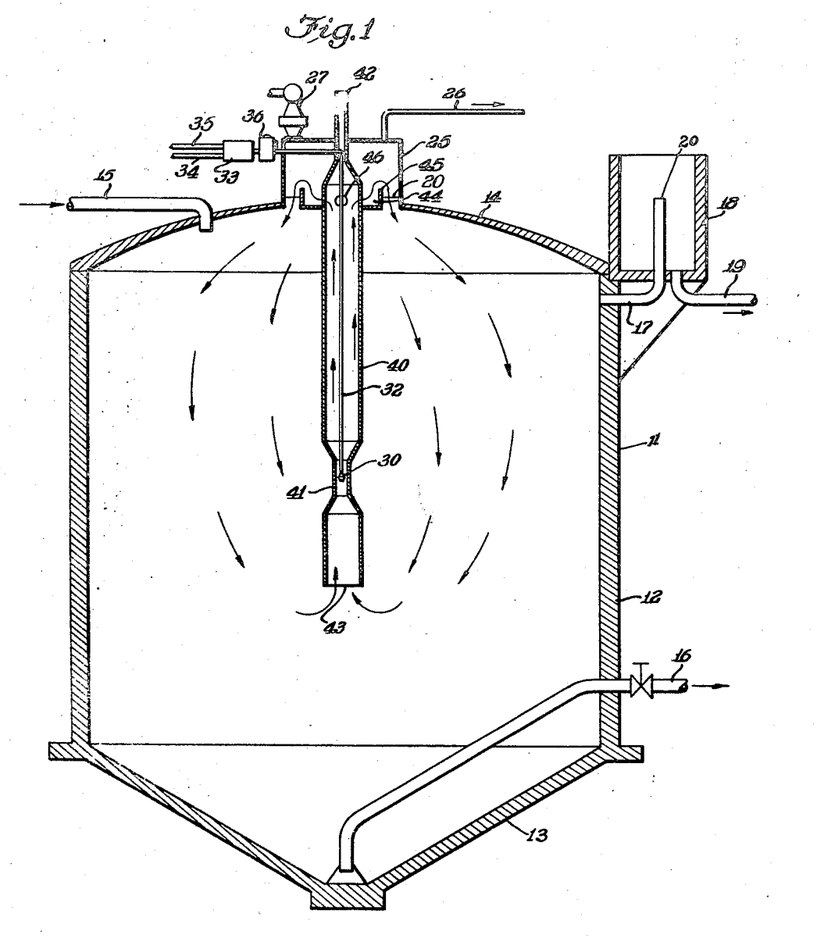
Figure 1 is a vertical cross-sectional view of a fixed cover digester utilizing a preferred embodiment of our invention.

Figure 1 illustrates a preferred embodiment of our invention, utilized in connection with a fixed cover digester. The digester 11 is of customary construction, usually cylindrical in shape, including a side wall 12, a sloping bottom 13, and a fixed cover 14. Sewage to be digested is introduced through an inlet conduit 15 discharging into the tank and digested sewage sludge is removed through the valved outlet conduit 16. As is well known, the process of digestion results in breaking down the complex organics of sewage sludge in water, gas (primarily methane), and the inert organics of the mineralized sludge. It is customary to provide for the withdrawal of supernatant as by the supernatant conduit 17 leading from an upper portion of the digester 11 into a supernatant box 18 which is located adjacent the top of the digester. Supernatant flows from the supernatant, or constant head, box 18 through a supernatant withdrawal line 19. In order to prevent air from getting into the digester through the supernatant line it is customary to provide a suitable trap, such as is illustrated in the figure which in a simple form may be only providing the supernatant line 17 with an upturned elbow which leads to an intermediate level 20 of the supernatant box. This means establishes the liquid level of the digester contents and prevents air from entering the digester. By this latter means excess water may be displaced from the digester with the introduction of raw sludge without permitting air to enter the digester. As indicated above, a mixture of air and sewage gas is very explosive so that it is very necessary to carefully avoid permitting air to enter the digester.

Customarily in a fixed cover digester, the roof or cover 14 slopes upwardly to a central gas dome 25 so that all of the gas generated by the digestive process can be collected at one point. Such a gas dome is customarily provided with a gas line 26 conducting the gas to a point of use. Such a gas dome 25 is also customarily provided with a pressure relief and vacuum breaker valve 27 usually equipped with a flame arrester. The apparatus heretofore described in connection with Figure 1 is old and is not claimed herein, except in conjunction with the new and improved heating elements described hereafter.

Figures 3, 6:
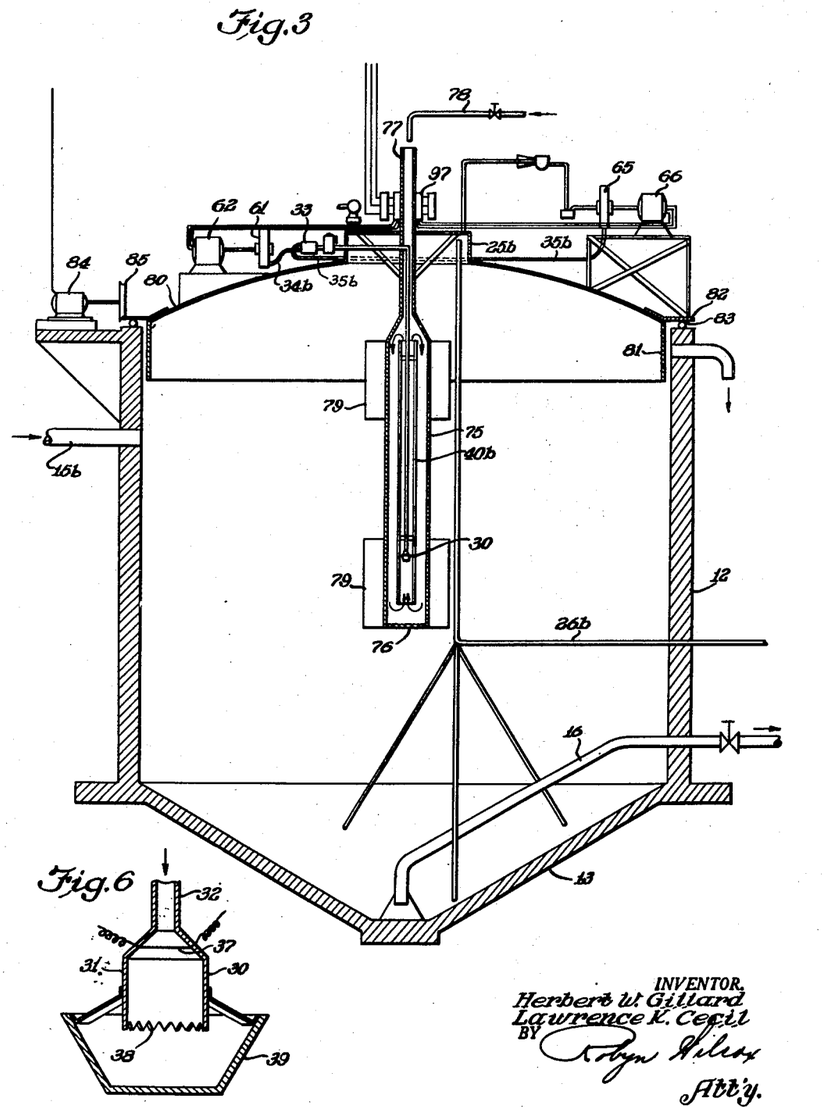
Figure 3 is a vertical cross-sectional view of a rotating cover digester utilizing a second embodiment of our invention, in which the submerged burner is not placed in direct contact with the sludge but is contained in a secondary chamber filled with other liquid, such as water.
Figure 6 is a cross-sectional view of a typical submerged burner such as is utilized in the practice of our invention.

Briefly our invention comprises providing a burner 30 which is submerged at a central elevation of the digester 11. For purposes of illustration a typical submerged burner is shown in Figure 6. Such a burner may comprise a casing or combustion chamber 31 into which a mixture of combustible gas and air is introduced through a restricted inlet 32. The casing 31 is provided with an electrical heating wire 37 to ignite the gas. The lower end of the casing 31 is open, as shown, for the escape of combustion gases, and preferably is serrated as shown at 38 in order to disperse the combustion gases into small bubbles. Preferably a surge baffle 39 below the open lower end of the combustion chamber 31 serves to prevent surges of liquid from extinguishing the flame in the combustion chamber 31. As shown in Figure 1, both air and gas are fed into a mixing chamber 33 under suitable compression, such as air through compressed air line 34 and gas through gas line 35. The inlet conduit 32 is provided with a flame arrester 36, so that in the event of any backfiring the flame will not reach the mixing chamber 33. The mixture is maintained under sufficient pressure that under ordinary conditions there will be no backfiring from the combustion chamber 31.

The entire burner is relatively small so that it occupies little space, being just large enough to provide a small protected chamber for the combustion of air and gas. It is preferred that as far as practical the flames fill the chamber 31 thereby providing a minimum of structural equipment and a maximum of heat transfer. The operation of such structure is obvious, the gas and air being introduced under pressure (ordinarily about six pounds per square inch over and above digestion tank pressure at burner location), displace liquid from the combustion chamber 31. The heater wire 57 ignites the mixture which thereafter burns steadily although submerged in liquid. The combustion gases immediately escape through the lower open end 38 of chamber 31 into the surrounding liquid to heat and circulate the same. With the pressure specified, the velocity of flow of mixed gas and air may be about 25,000 feet per minute through the inlet pipe 32 and about 1200 feet per minute in the combustion chamber. This is sufficient to prevent backfiring from the combustion chamber into inlet pipe 32.

Figures 4, 5:
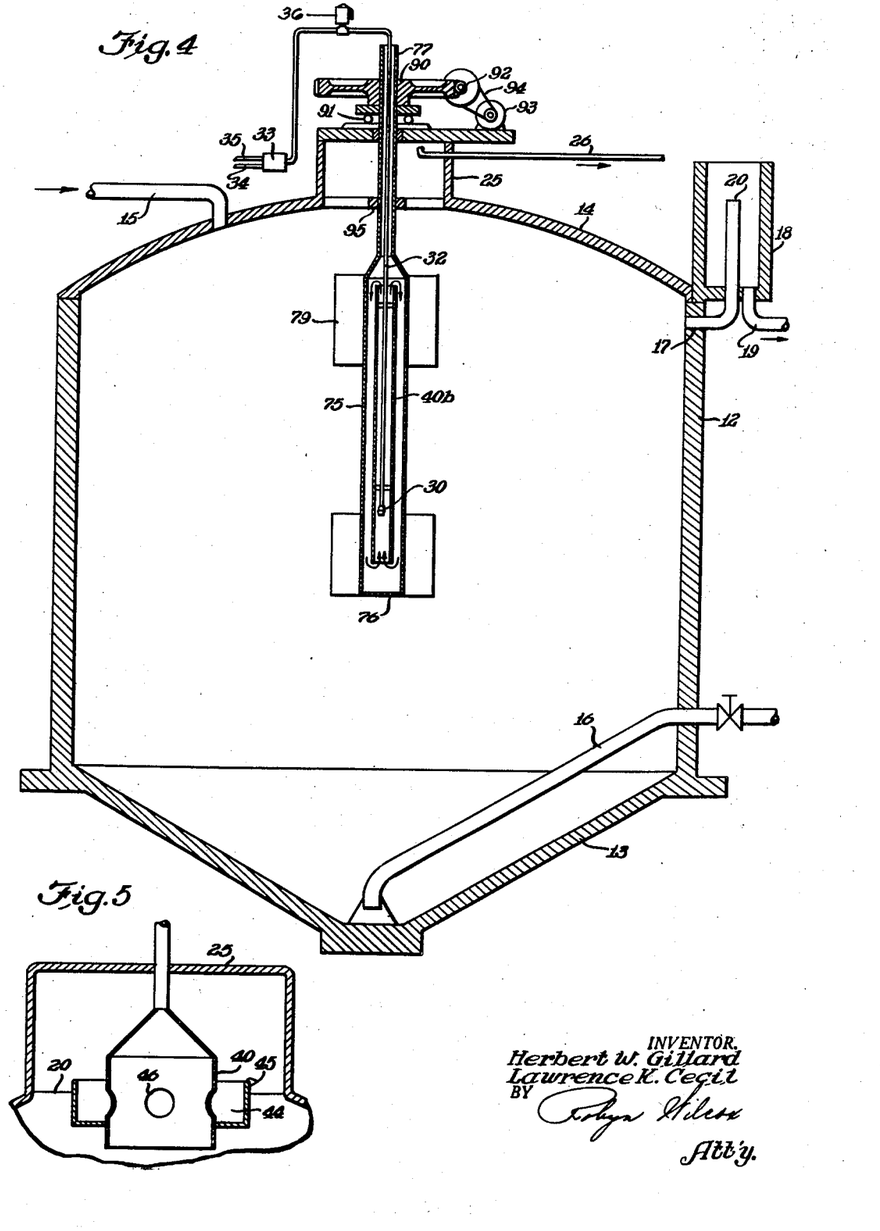
Figure 4 is a vertical cross-sectional view of a fixed cover digester utilizing an embodiment of our submerged heater similar to that shown in Figure 3.
Figure 5 is a vertical cross-sectional view of the upper portion of the heater tube of the embodiment shown in Figures 1 and 2.

We prefer to place the submerged burner 30 in a circulating tube 40 preferably at the level of a restriction 41 therein, as shown in Figure 1. The lower end 43 of the circulating tube 40 is located a short distance below the burner, and the upper end 42 is outside and above the top of the gas dome 25 thus providing a vent for escape of such gases. Preferably, as is illustrated in Figure 5, which shows these features in enlarged detail, the circulating tube 40 is surrounded with a launder 44 having a weir 45 slightly above the normal liquid level 20 of the tank. A series of ports 46 open from the interior of the tube into the launder 44 below the level of the weir 45. This structure provides means for heating and circulating the sludge undergoing digestion upwardly through the circulating tube, 40, and its discharge into the top of the digester, and the escape of the combustion gases from the circulating sludge without permitting air to become admixed therewith. This structure also provides for discharge of the circulating sewage onto the top of the scum in the digester thereby breaking up such scum which might otherwise collect there.

The operation of such a submerged burner is quite simple. Compressed air and compressed gas are separately introduced into the mixing chamber 33 through air inlet 34 and gas inlet 35 respectively. The pressure of the two is sufficient to displace liquid from the combustion chamber 31 and to prevent backfiring from the combustion chamber. It is known in the art that pressures inside digesters are in excess of atmospheric. It will be understood that the gas and air must be under greater pressure than that in the tank 11, for the pressure of the air and gas must be sufficient to overcome the pressure in the tank plus the pressure of liquid caused by the submergence of the burner in the sludge and in addition to give a velocity of flow in the inlet conduit 32 sufficient to prevent backfiring. The hot wire 37 ignites the mixture which burns steadily thereafter, the mixture of air and gas, and the resultant combustion gases, keeping the interior of the burner casing 31 free of liquid so that combustion can readily go forward. The combustion in the burner 30 heats the surrounding liquid, causing it to rise by convection currents. This movement is facilitated by the combustion gases which are forced out the lower end of the burner casing 31 and rise upwardly in the circulating tube 40, thereby lifting the sludge in the circulating tube. The sludge in the tube 40 is lifted to a level slightly above the level of the weir 45. At this point the combustion gases separate from the sludge and escape through the vent 42. The heated sludge flows out through the ports 46 into the launder 44 and thence over the weir 45 onto the top of the sludge in the digester.

As this process continues there is a continuous heating of the sludge and a continuous circulation of the sludge through the circulating tube 40. The structure shown and described provides for keeping air and flame from any body of sewage gas, thereby preventing its explosion, and also provides that the combustion gases are vented from the digester in such a manner as to avoid co-mingling with the sewage gas. In the event that the flame in the submerged burner 30 should become extinguished, as through a failure of the air or gas supply, it would still be impossible to mix air with the digestion gases even though air were continuously pumped into the burner. Such air would merely displace liquid from the burner casing and then rise upwardly through the sludge in the circulating tube, escaping from the surface of the sludge, thence going upwardly through the vent 42. We might mention, however, that we prefer to automatically shut off the supply of air if the flame is extinguished. As digestion is an anaerobic process it is better not to introduce unnecessary air thereto. In most instances, the burner would operate only such portion of the time as is necessary to maintain temperatures within a desired range—the gas and air supply being controlled by a thermostatic device as is well known to those skilled in the art. We prefer, when heating is not necessary, to close the air supply as well as the gas supply. Upon re-establishment of operating conditions, that is, the supply of both air and gas, the flame can again be lighted by the heating of the wire 37 and the heater will continue in operation thereafter.

Figure 2:
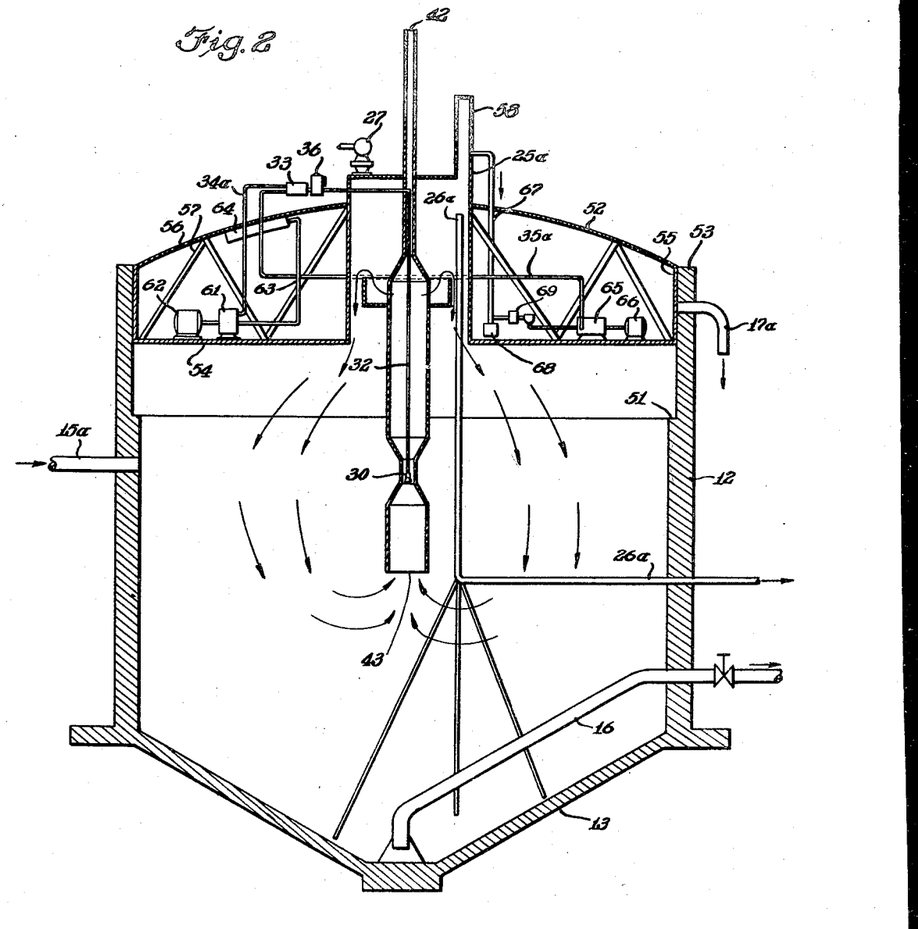
Figure 2 is a vertical cross-sectional view of a floating cover digester utilizing the same type of heater as shown in Figure 1.

Figure 2 illustrates the same embodiment of our invention applied to a floating cover digester. Such digesters are usually cylindrical in shape, having a side wall 12 and sloping bottom 13. Customarily the side wall 12 is provided with a stop or projection 51 to limit the extent to which the floating cover 52 may drop. In such a digester the digested sludge outlet 16 is similar in construction to that of Figure 1. The raw sludge inlet 15a customarily enters through a wall at a level below the stop 51. The supernatant overflow 17a leads from a level in the tank intermediate the stop 51 and the top 53 of the side wall.

The floating cover 52 is customarily a covered float fitting snugly within the upper portion of the side wall 12, but free to move vertically with the level of sludge in the digester. A customary construction is to provide a bottom 54, side walls 55, and a top 56, suitably strengthened by braces 57. A gas dome 25a is ordinarily placed in the center of the floating cover 52, and extends upwardly to an elevation above the top 56. Gas is removed from the dome 25a through a gas outlet 26a, which leads downwardly to a point below the lowest travel of the cover and through the wall of the tank, as shown in Figure 2. In order to avoid the use of flexible connections in such a construction it is customary to provide an extension 58, above the gas outlet 26a, to permit the collection of sludge gas when the floating cover is at its lowest level and still permit the upper end of the gas outlet 26a to be at a level sufficiently high that it will not be covered with sludge when the cover is at its uppermost level.

In such a construction the submerged gas burner 30 which is shown, for purposes of illustration, as being identical with the burner shown in Figure 1, preferably is rigidly secured in the gas dome 25a, the upper end 42 extending through the top of the gas dome 25a to vent the combustion gases to atmosphere. As the construction of the burner and circulating tube is the same as shown in Figure 1, it need not be discussed in detail. It can be noted, however, that in this type of construction the air and gas compressor can be carried by the floating cover. For example an air compressor 61 and its driving motor 62 may be mounted in the interior of the floating cover. A compressed air line 34a leads from the compressor to the mixing chamber 33 as indicated. Air may be supplied to the compressor through a line 63 leading to the compressor from an air filter 64, located in the roof 56 of the floating cover. Similarly, a gas compressor 65 and its driving motor 66 may also be mounted in the floating cover, the gas inlet 35a leading from the compressor 65 to the mixing chamber 33 as indicated. Gas may be supplied to the compressor by any suitable means such as a gas conduit 67 leading from the extension 58 of the gas dome to the compressor 65. Preferably this gas conduit 67 will be equipped with a drip trap 68, and flame trap and pressure relief valve 69.

The operation of this embodiment is identical with that described in connection with Figure 1 and need not be discussed in detail.

Figure 3 illustrates a second embodiment of our invention applied, for purposes of illustration, to a rotating cover digester. The construction of the digester tank, exclusive of cover, the sludge inlet and outlet, and the supernatant overflow are the same as shown in Figure 2 and need not be described. In this form the rotating cover 80 may include a side wall 81, the cover being open at the bottom as shown. The rotating cover 80 is supported by a flange 82 rigidly secured to the rotating cover, which in turn rides upon ball bearings 83, carried on the top of the digester wall 12. As in Figure 2, the gas outlet 26b leads downwardly from the gas dome 25b, and out through a side wall of the tank. The cover 80 can be rotated by any suitable means, such as motor 84, driving a friction wheel 85 contacting the flange 82.

In this embodiment the submerged burner is not directly in contact with the sludge undergoing digestion, but heats a body of water contained in a secondary chamber which indirectly heats the sludge. This embodiment also may preferably include circulating paddles which are rotated by any suitable means (in this case by rotation of the cover and heater) to supplement the convection currents and thus secure adequate circulation of sludge undergoing digestion.

In this embodiment the submerged burner 30 is placed in a short circulating tube 40b which in turn is enclosed in a heat transfer chamber 75. The heat transfer chamber is closed at the bottom by end 76, and an extension thereof 77 extends through the top of the gas dome 25b, in order to permit combustion gases to freely escape from the heater. Water to fill the heat transfer chamber may be supplied by any suitable means, such as pipe 78 discharging into the open upper end of the extension 77. Preferably the heat transfer chamber will be equipped with paddles 79 and the whole chamber will be rotated in order to provide stirring and agitation of the sludge undergoing digestion.

In this embodiment the heat transfer chamber 75 is rigidly suspended from the rotating cover 80 and rotates with it. The air compressor 61 and its driving motor 62, and the gas compressor 65 and its driving motor 66 may be mounted on the top of the revolving cover, as shown, and may receive their power through a commutator 97 which may surround the upper extension 77 of the heat transfer chamber.

Figure 4 illustrates the embodiment of the heating assembly described in connection with Figure 3, when used in connection with a fixed cover digester. In this figure the digester is essentially the same as in Figure 1, while the heating assembly comprising the submerged burner 30, the circulating tube 40b, the heat transfer chamber 75 and paddles 79 are the same as described in connection with Figure 3. The rotation of the heating assembly can be secured by any suitable means, such as supporting the heat transfer chamber from gear 90 which in turn is supported by bearing 91 riding on the top of the gas dome 25. The gear, 90, is driven by a suitable worm 92 which in turn is driven by a motor 93 through the medium of belt 94. In such a construction it is preferred that a suitable bearing 95 be located in the digester to hold the rotating heat transfer chamber against sway and vibration.

In such construction we prefer that the circulating tube, 40b, be suspended in the heat transfer chamber 75 such as by mounting it on the inlet conduit 32, which inlet conduit can enter the open top of extension 77 of the heat transfer chamber and support the circulating tube 40b and burner 30 in the interior of the heat transfer chamber. In this embodiment the heat transfer chamber is filled with any suitable liquid, preferably water, through the open top 77 thereof.

In the embodiment of Figures 3 and 4, the submerged burner 30 directly heats the water in the heat transfer chamber 75 which in turn heats the sludge in the digester. Heating and circulation is assisted by the rotation of the heat transfer chamber and its associated paddles 79. In one sense this embodiment is not quite as efficient as the form illustrated in Figures 1 and 2 as the sludge is heated indirectly by the heating of intermediate water. Thus there is some loss of efficiency in the heating process. Also, it is possible for the outside of the heat transfer chamber to be encrusted with dried sludge which would interfere with the heating of sludge. Such encrustation is not possible in the form shown by Figures 1 and 2, as in that embodiment heating is secured by direct heating of a body of sludge by the combustion gases rather than through the medium of a heat transfer surface. Still, however, this embodiment is more efficient than the old means, as the entire heating apparatus can be readily lifted out of the gas dome, the top of which can be removable, in the event cleaning or repair should become necessary.

The operation of each of the embodiments is obvious from the above description.

We claim:

1. In a sludge digester including a covered tank, a sludge inlet into said tank, a sludge outlet from the lower portion of said tank, a liquid outlet from the upper portion of said tank, and means for withdrawing digestion gases from the top of said tank, an improved apparatus for heating the contents of said tank comprising the combination of a gas burner in the interior of said tank below said liquid outlet, a fuel inlet leading to said gas burner from the exterior of said tank, a draft tube surrounding said burner and having a liquid inlet and a submerged overflow, said burner discharging the gases of combustion into said draft tube, and means for withdrawing the inert gases of combustion from said tank separately from said digestion gases, said means including a vent associated with said draft tube and positioned to receive the gases of combustion rising through said draft tube, said vent extending through the cover of said tank.

2. In a sludge digester including a digestion tank, a floating cover, a sludge inlet into said tank, a sludge outlet from the lower portion of said tank, a liquid outlet from the upper portion of said tank, a gas dome at the top of said floating cover, and a gas outlet leading from the interior of said gas dome, an improved apparatus for heating the contents of said tank comprising the combination of a gas burner supported by said floating cover and spaced a substantial distance therebelow, a draft tube surrounding said burner and extending through said floating cover, outlet ports through said draft tube spaced at a level adjacent but below the liquid surrounding said draft tube, and air and gas inlet means leading to said gas burner.

3. In a sludge digester including a covered tank, a sludge inlet into said tank, a sludge outlet from the lower portion of said tank, a liquid outlet from the upper portion of said tank, a gas dome at the top of said tank, and a gas outlet leading from the interior of said gas dome, an improved apparatus for heating the contents of said tank comprising a gas burner in the interior of said tank spaced a substantial distance below said liquid outlet, an open ended draft tube surrounding said burner and receiving the gases of combustion from said burner, an outer draft tube closed at its lower end and surrounding said first draft tube and extending from an elevation below the lower end of said first draft tube through the cover of said tank, means for introducing water into said outer draft tube, and gas and air inlet means leading to said gas burner.

4. In a sludge digester including a covered tank, a sludge inlet into said tank, a sludge outlet from the lower portion of said tank, a liquid outlet from the upper portion of said tank, a gas dome in the top of said tank and a gas outlet from said gas dome, an improved apparatus for heating the contents of said tank comprising the combination of a gas burner in the interior of said tank spaced a substantial distance below said liquid outlet, an open ended draft tube surrounding said burner and receiving gases of combustion therefrom, said draft tube extending from a level below said burner upwardly through the cover of said tank, outlet ports through said draft tube spaced at a level adjacent but below the level of liquid surrounding said draft tube, and air and gas inlet means leading to said gas burner.

5. In a sludge digester including a covered tank, a sludge inlet into said tank, a sludge outlet from the lower portion of said tank, a liquid outlet from the upper portion of said tank, a gas dome at the top of said tank and a gas outlet from said gas dome, an improved apparatus for heating the contents of said tank comprising the combination of a gas burner in the interior of said tank spaced a substantial distance below said liquid outlet, a draft tube surrounding said burner, said draft tube being open at each end and extending from a level below said burner upwardly through the cover of said tank, a launder surrounding said draft tube, said launder being provided with a weir a slight distance above the level of said liquid outlet, a passageway through said draft tube into said launder below the level of said weir, and inlet means for introducing compressed air and gas to said burner.

6. In a sludge digester including a covered tank, a sludge inlet into said tank, a sludge outlet from the lower portion of said tank, a liquid outlet from the upper portion of said tank, a gas dome at the top of said tank, and a gas outlet from said gas dome, an improved apparatus for heating the contents of said tank, comprising the combination of a gas burner in the interior of said tank spaced a substantial below the level of said liquid outlet, a vertical draft tube surrounding said burner, an outer draft tube surrounding said first mentioned draft tube, said outer draft tube being closed at its bottom and extending from a level below inner draft tube upwardly through the cover of said tank, paddles supported by the outer draft tube, means for rotating said outer draft tube, means for delivering compressed air and gas to said gas burner, and means for introducing water into said outer draft tube.

7. In combination a covered sludge digestion tank, an outlet for the gases formed in the process of digestion leading from the top of said tank, a liquid outlet leading from an upper portion of said tank, a sludge inlet into said tank, a sludge outlet from the lower portion of said tank, a burner in the interior of said tank at a level below that of the liquid outlet, a draft tube surrounding said burner and receiving the gases of combustion therefrom, said draft tube having a liquid inlet and a liquid outlet spaced below and above said burner, respectively, fuel inlet means leading to said burner from the exterior of said tank, and means associated with said draft tube for collecting the inert gases formed in the process of combustion and withdrawing them separately from said digestion gases from the top of said draft tube, said means including a vent leading to outside the tank.

8. A sludge conditioning apparatus comprising a covered tank, a sludge inlet into said tank, a liquid outlet from the upper portion of said tank, a sludge outlet from the lower portion of said tank, means for removing gas released in the conditioning of the sludge from the top of said tank, a burner in the interior of said tank spaced a substantial distance below the level of said liquid outlet, a draft tube surrounding said burner and receiving the gases of combustion therefrom and having an inlet and an outlet spaced below and above said burner, respectively, means for introducing combustible material to said burner, and means for withdrawing combustion gases from the upper part of said draft tube and removing them from said tank separately from said released gas.

9. In the anaerobic digestion of a body of sewage sludge wherein a combustible gas is formed and withdrawn from the digestion zone, the improved method of maintaining a predetermined temperature of said body of sludge favorable for digestion which comprises burning a portion of said withdrawn combustible gas in the interior of said body of sludge undergoing digestion and a substantial distance below the surface thereof, thereby directly heating the sludge by such submerged combustion and conducting the inert gases resulting from said combustion separately from said combustible gas to a point outside of said body of sludge.

10. In a sludge digester including a covered tank, a sludge inlet into said tank, a sludge outlet from the lower portion of said tank, a liquid outlet from the upper portion of said tank, and an outlet for digested gas from the top of said tank, an improved apparatus for heating the contents of said tank comprising the combination of a gas burner in the interior of said tank below said liquid outlet, a fuel inlet leading to said gas burner from the exterior of said tank, a draft tube surrounding said burner, said draft tube receiving the gases of combustion from said burner and having a liquid inlet at one end and a liquid outlet at the other end thereof, and means preventing the intermingling of said combustion gases with the digester gas, said means including a gas vent receiving the combustion gases from said draft tube and extending through the cover of said tank, and a liquid seal associated with said draft tube and preventing said combustion gases from escaping through a path other than said vent.

11. In the digestion of sewage sludge wherein combustible gas is formed in the body of sludge and permitted to rise through the sludge undergoing digestion and collected in a gas collection chamber over the surface of the digesting sludge, a method of heating the digesting sludge comprising withdrawing gas from said gas collection chamber and introducing it and burning it under pressure in a combustion chamber, and discharging the hot gases of combustion directly into sludge undergoing digestion below the surface thereof whereby heat is transferred directly from the gases of combustion to the sludge and whereby there is created a circulation of sludge adjacent the point of hot gas introduction, said gases of combustion being delivered into, and delivered to the atmosphere from, a chamber so placed and enclosed as to effectively isolate the gases of combustion from admixture or contact with the gases in said gas collection chamber.

12. A method of heating sludge undergoing digestion to maintain a temperature favorable for digestion, which comprises burning combustible material under pressure and discharging the hot gases of combustion resulting from such burning within a submerged layer of digesting sludge, thereby heating said sludge by direct heat transfer and causing a circulation within the sludge, and separating the gases of combustion from the digesting sludge and withdrawing them to waste separately from the combustible digester gases.

13. In the digestion of sewage sludge at an elevated temperature wherein combustible gas is formed and collected above the body of digesting sludge, a method of maintaining such elevated temperature which comprises burning combustible material in a burner directly submerged in liquid at a point a substantial distance below the surface of said body of sludge, discharging the gases of combustion from said burner into the liquid surrounding said burner, and collecting and withdrawing the gases of combustion from said body of sludge separately from said combustible gas.

LAWRENCE K. CECIL.
HERBERT W. GILLARD.

REFERENCES CITED

The following references are of record in the file of this patent:

UNITED STATES PATENTS

| Number | Name | Date |
|---|---|---|
| 1,717,100 | Downs | June 11, 1929 |
| 1,912,595 | Schlenz | June 6, 1933 |
| 2,077,545 | Brossman | Apr. 20, 1937 |
| 2,156,123 | Mount | Apr. 25, 1939 |
| 2,182,286 | Doennecke et al. | Dec. 5, 1939 |
| 2,188,847 | Streander | Jan. 30, 1940 |
| 2,211,171 | Self | Aug. 13, 1940 |
| 2,233,675 | Narten | Mar. 4, 1941 |
| 2,263,451 | Bach | Nov. 18, 1941 |
| 2,348,670 | Woodward | May 9, 1944 |

FOREIGN PATENTS

| Number | Country | Date |
|---|---|---|
| 292,736 | Great Britain | June 28, 1928 |

Certificate of Correction

Patent No. 2,538,412

January 16, 1951

LAWRENCE K. CECIL ET AL.

It is hereby certified that error appears in the printed specification of the above numbered patent requiring correction as follows:

Column 4, line 10, for "in" read *into*; line 51, for "srown" read *shown*; column 10, line 20, after the word "substantial" insert *distance*; line 25, after "below" insert *said*; column 11, line 10, for "digested" read *digester*;

and that the said Letters Patent should be read as corrected above, so that the same may conform to the record of the case in the Patent Office.

Signed and sealed this 27th day of March, A. D. 1951.

[SEAL]

THOMAS F. MURPHY,
*Assistant Commissioner of Patents.*